(12) United States Patent
Kuh

(10) Patent No.: US 7,761,893 B2
(45) Date of Patent: Jul. 20, 2010

(54) DIGITAL TELEVISION TRANSLATOR WITH PSIP UPDATE

(75) Inventor: Steve Kuh, Chatsworth, CA (US)

(73) Assignee: KTech Telecommunications, Inc., Chatsworth, CA (US)

( * ) Notice: Subject to any disclaimer, the term of this patent is extended or adjusted under 35 U.S.C. 154(b) by 0 days.

(21) Appl. No.: 12/314,078

(22) Filed: Dec. 3, 2008

(65) Prior Publication Data

US 2009/0187959 A1    Jul. 23, 2009

Related U.S. Application Data

(63) Continuation of application No. 10/890,210, filed on Jul. 14, 2004, now Pat. No. 7,487,533, which is a continuation of application No. 09/545,613, filed on Apr. 5, 2000, now Pat. No. 6,785,903.

(51) Int. Cl.
| | |
|---|---|
| *H04N 5/445* | (2006.01) |
| *H04N 7/16* | (2006.01) |
| *G06F 3/00* | (2006.01) |
| *G06F 13/00* | (2006.01) |

(52) U.S. Cl. .................... 725/50; 725/115; 725/116
(58) Field of Classification Search ................ 725/50, 725/114–118
See application file for complete search history.

(56) References Cited

U.S. PATENT DOCUMENTS

| | | | |
|---|---|---|---|
| 5,694,419 A | 12/1997 | Lawrence et al. | |
| 5,774,193 A | 6/1998 | Vaughan | |
| 5,852,612 A | 12/1998 | Kostreski et al. | |
| 5,884,181 A | 3/1999 | Arnold et al. | |
| 5,978,650 A | 11/1999 | Fischer et al. | |
| 6,233,255 B1 | 5/2001 | Kato et al. | |
| 6,249,320 B1 | 6/2001 | Schneidewend et al. | |
| 6,313,886 B1 * | 11/2001 | Sugiyama | 348/731 |
| 6,400,415 B1 | 6/2002 | Danielsons | |
| 6,414,720 B1 | 7/2002 | Tsukidate et al. | |
| 6,971,119 B1 | 11/2005 | Arsenault et al. | |

(Continued)

OTHER PUBLICATIONS

Guide to the Use of the ATSC Digital Television Standard, Doc. A/54, Oct. 4, 1995, Table of Contents and pp. 1-136.

(Continued)

*Primary Examiner*—Hunter B. Lonsberry
(74) *Attorney, Agent, or Firm*—Morgan, Lewis & Bockius LLP

(57) ABSTRACT

A digital television translator includes a digital television receiver for receiving a first digital television signal at a first frequency and generating a digital transport stream from the first digital television signal. The digital transport stream can include original Program and System Information (PSIP) data having RX channel data that is indicative of the first frequency, the first major channel number, and/or the first minor channel number. The digital television translator also includes a PSIP update module for updating the original PSIP data in the digital transport stream by replacing the RX channel data with TX channel data. The TX data is indicative of a second frequency, a second major channel number, and/or a second minor channel number. The digital television translator further includes a digital television modulator for converting the digital transport stream having the updated PSIP data into a second digital television signal at the second frequency, where the second frequency can be the same or different from the first frequency.

15 Claims, 4 Drawing Sheets

U.S. PATENT DOCUMENTS

| | | | |
|---|---|---|---|
| 6,973,663 | B1 | 12/2005 | Brown et al. |
| 7,254,829 | B1 | 8/2007 | Brown et al. |
| 2001/0009556 | A1 | 7/2001 | Kato et al. |
| 2002/0145679 | A1* | 10/2002 | Barreyro et al. ............. 348/723 |

OTHER PUBLICATIONS

ATSC VSB Translator, Product Literature, Zenith Electronics Corporation, obtained at the National Association of Broadcaster's Convention in Las Vegas, held between Apr. 10, 2000 and Apr. 13, 2000.

ATSC Digital Television Standard, Doc. A/53, Apr. 12, 1995 and Sep. 16, 1995, Table of Contents and pp. 1-16.

Program and System Information Protocol for Terrestrial Broadcast and Cable, Doc. A/65, Dec. 23, 1997, Table of Contents and pp. 1-93.

ATSC VSB Translator Datasheet (Undated).

KTech Telecommunications, Inc. 8-VSB Remodulator Application Note, Apr. 1999, pp. 1-4, available via http://archive.org.

KTech Telecommunications, Inc. 8-VSB Remodulator Model No. VSB-REMOD-100, Oct. 1999, pp. 1-2, available via http://archive.org.

KTech Telecommunications, Inc. 8-VSB Remodulator Product Description, Mar. 2000, pp. 1-2, available via http://archive.org.

John Taylor, "Zenith Introduces New Product to Advance the Roll-Out of DTV Translators," Apr. 8, 2000, retrieved from http://www.zenith.com.

KTech Telecommunications, Inc. Homepage, Apr. 1999, p. 1, available via http://archive.org.

WayBack Machine search result for ktechlelecom.com, search for on Jun. 23, 2003, available via http://archive.org.

* cited by examiner

DIGITAL TELEVISION TRANSLATOR WITH PSIP UPDATE

This application is a Continuation application of U.S. patent application Ser. No. 10/890,210 filed on Jul. 14, 2004, now U.S. Pat. No. 7,487,533, which is a continuation of U.S. patent application Ser. No. 09/545,613, filed on Apr. 5, 2000, now U.S. Pat. No. 6,785,903. The prior applications are incorporated by reference in their entirety.

BACKGROUND OF THE INVENTION

1. Field of the Invention

The present invention relates to a digital television translator. More particularly, the present invention relates to a digital television translator that updates the program and system information protocol (PSIP) table with transmit (TX) channel data.

2. Discussion of the Related Art

Digital television (DTV) broadcasting systems are relatively new in the United States and offer many alternatives to traditional information and program distribution. In addition to traditional television programming, DTV systems offer the ability to distribute additional content in the form of data. This data can be any type of data including, for example, Internet data broadcast to one or more end users. Therefore, DTV broadcast systems offer great flexibility and diversity in the types of information they distribute. Like most conventional broadcast systems, DTV broadcast systems have a finite capacity limited by the bandwidth of its channels.

Additionally, as with other broadcast systems, such as analog television systems, the received DTV signal quality can vary greatly depending upon where the receiver is located. This problem is due to a number of adverse propagation effects such as multi-path, interference, and simple attenuation. One solution to this problem is to use multiple low power repeaters (On-Channel boosters) and/or translators (Re-modulators) to improve reception in areas of poor DTV signal reception. For example, a repeater, placed in an area of poor signal reception, receives a transmitted signal from a high power DTV transmitter and re-transmits an amplified duplicate signal at the same frequency. Translators, on the other hand, can receive a transmitted signal from a high power DTV transmitter and re-transmit the signal at a frequency different than the received frequency. Repeaters and translators are also used to extend the coverage of a broadcast system incrementally, and economically, to specific geographical regions.

FIG. 1 shows an example of a conventional DTV translator 1. The conventional DTV translator includes a down converter 2, a first local oscillator 3, an up converter 4, and a second local oscillator 5. A received DTV signal (RX RF input) is down converted to IF (intermediate frequency) by down converter 2. The IF is determined by the difference between the frequency LO1 generated by the first local oscillator 3 and the RF frequency of the received DTV signal (RX RF Input). The IF signal is then up converted to RF by up converter 4. The frequency of the up converted RF DTV signal (TX RF Output) is determined by the sum of the frequency LO2 generated by the second local oscillator 5 and the IF. The up converted DTV signal (TX RF Output) is then amplified and transmitted. With this arrangement, the transmitted signal contains the same information as the received signal, but is amplified. Further, when LO1=LO2, the transmit frequency is the same as the received frequency, and the apparatus operates as an on-channel booster. Alternatively, when LO1.noteq.LO2, the transmit frequency is different than the received frequency, and the apparatus operates as a translator.

In the DTV American Television Systems Committee (ASTC) standard, a DTV signal contains a Program and System Information Protocol (PSIP) table, which is a collection of hierarchically arranged sub-tables for describing system information and program guide data. One of sub-tables in the PSIP table is the Virtual Channel Table (VCT), which contains a list of attributes for virtual channels carried in the digital transport stream (baseband information). VCT fields "major channel number" and "minor channel number" are used for identification. The major channel number is used to group all channels that are to be identified as belonging to a particular broadcast corporation (or a particular identifying number such as channel "12"). The minor channel number specifies a particular channel within the group. The VCT also contains a "carrier frequency" field, which is used to identify the frequency at which the DTV signal is transmitted and received. As discussed herein, TX and RX channel data include at least one of the following major channel number, minor channel number, carrier frequency, and/or other data necessary for generating a proper DTV signal.

When a RF DTV signal is translated to a new frequency by the conventional DTV translator 1 of FIG. 1, the PSIP table no longer reflects the correct carrier frequency. In many DTV receivers, this discrepancy between the actual frequency of the received DTV signal and the carrier frequency data contained in the PSIP table prevents the receiver from properly receiving the DTV signal.

Also, a particular broadcast corporation may be assigned different major/minor channel numbers in geographical regions serviced by each translator. For example, Broadcast Corporation #1 could be assigned major/minor channel 12/04 in region #1 (served by a main DTV transmitter) and major/minor channel 37/04 in region #2 (served by a translator translating the main DTV transmitted signal). The conventional translator of FIG. 1 therefore generates a translated DTV signal that contains an incorrect channel number for transmission into region #2.

Moreover, in region #2, major minor/channel 12/04 may have already been assigned to Broadcast Corporation #2. In that case, a single DTV receiver in region #2 will receive two unique channels (Broadcast Corporation #1 and Broadcast Corporation #2) each having the same major/minor channel number in each of their PSIP tables. While some DTV receivers overcome these anomalies by allowing users to select whether to ignore PSIP data or to display the VCT information, other DTV receivers do not have this capability and are unable to properly tune to the program(s) of one or both of the two Broadcast Corporations.

SUMMARY OF THE INVENTION

Accordingly, the present invention relates to a digital television translator, and more particularly to a digital television translator that updates the PSIP table with proper channel and carrier frequency information. To achieve these and other advantages and in accordance with the purpose of the present invention, as embodied and broadly described, there is provided a digital television translator, comprising a digital television receiver for receiving a first digital television signal and generating a digital transport stream from the first digital television signal, the digital transport stream including original PSIP data having RX channel data; a PSIP update module for updating the original PSIP data in the digital transport stream by replacing the RX channel data with TX channel data; and a digital television modulator for converting the digital transport stream having the updated PSIP data into a second digital television signal.

In another aspect of the instant invention, there is provided an information distribution network using digital television transmission, the information distribution network comprising a plurality of digital television transmission nodes including a main digital television signal source for generating a main digital television signal; and a plurality of digital television translators receiving a digital television signal from one of the plurality of digital television nodes, at least one of said plurality of digital television translators including a digital television receiver for receiving the digital television signal from one of the plurality of digital television nodes and generating a digital transport stream from the received digital television signal, the digital transport stream including original ancillary data and original PSIP data having RX data, a data update module for updating the original PSIP data in the digital transport stream by replacing the RX channel data with TX channel data and for replacing the original ancillary data in the digital transport stream with new ancillary data, and a digital television modulator for converting the digital transport stream having the new ancillary data and the updated PSIP data into a transmitted digital television signal, wherein at least two of the plurality of digital television transmission nodes transmit at the same frequency and the total ancillary data of the information distribution network includes the new ancillary data from multiple digital television translators of the plurality of digital television translators.

Additional features and advantages of the present invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

To overcome the problems associated with the prior art, i.e., tuning problems with some DTV receivers due to incorrect PSIP table information, the PSIP table information is updated by the translator to properly reflect the new transmit carrier frequency and channel number.

Figure 1:
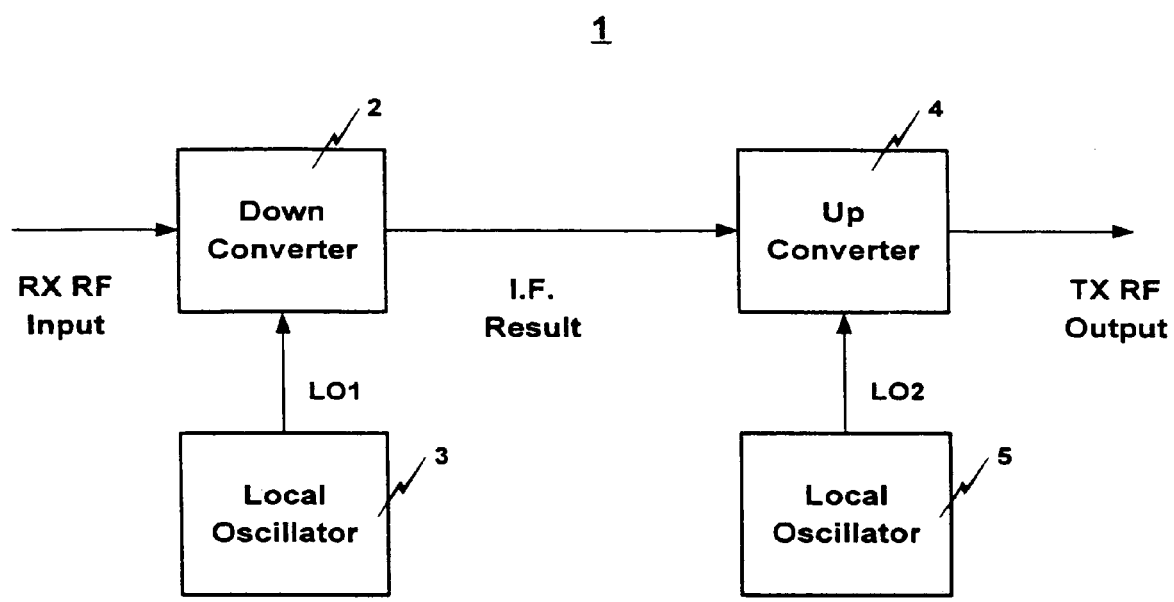
FIG. 1 shows an example of a conventional DTV translator.
Figure 2:
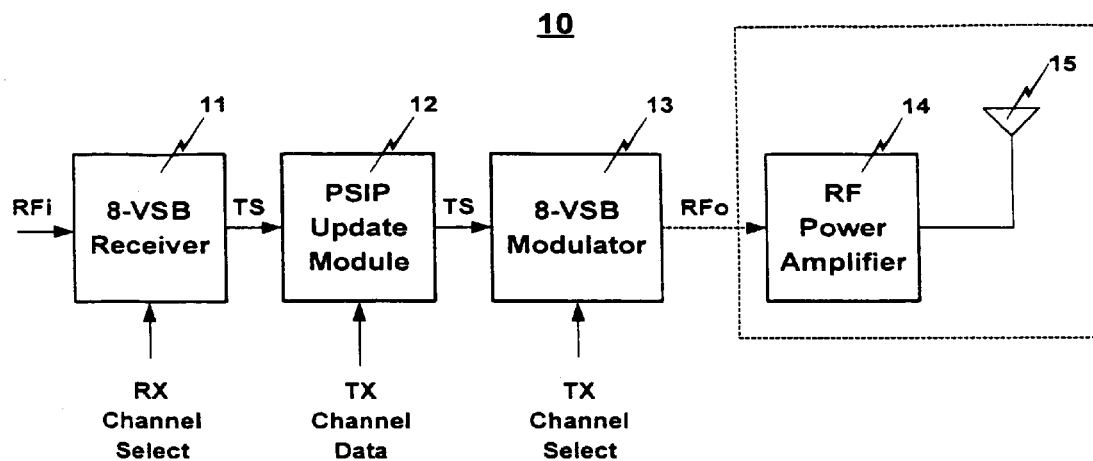
FIG. 2 shows a first embodiment of a DTV translator of the present invention having PSIP table update capability.

FIG. 2 shows a first embodiment of a DTV translator 10 of the present invention having PSIP table update capability. The DTV translator 10 includes an 8-VSB receiver 11, a PSIP update module 12, an 8-VSB modulator 13, an RF power amplifier 14, and a transmitting antenna 15. The receiver 11 receives an 8-VSB DTV signal (RFi) that may have been originally transmitted by a base station or another translator, over the air or by a cable. The receiver 11 processes the DTV signal according to ASTC DTV standards to produce a digital transport stream (TS) containing MPEG2 video data, audio data, ancillary data, and PSIP data. The PSIP data in the digital transport stream includes a major channel number, a minor channel number, and a carrier frequency, which together make up the RX channel data. As shown, the receiver 11 is controlled by an input (RX Channel Select) which informs the receiver 11 of which carrier frequency channel to tune.

The processing of the received DTV signal by the 8-VSB receiver 11 is in accordance with ATSC DTV standards and, accordingly, can include down conversion, digitization, carrier synchronization, symbol clock synchronization, frame and segment synchronization, matched filtering, equalization, bit-demapping, Trellis decoding, convolutional de-interleaving, Reed-Solomon forward error correction (FEC) decoding, and de-randomizing.

The digital transport stream (TS) is then input into PSIP update module 12. The PSIP update module 12 extracts the PSIP table data and updates the RX channel data with TX channel data. Specifically, the major channel number, the minor channel number, and the carrier frequency contained in the PSIP VCT are updated. Updated major and minor channel numbers are those numbers assigned to the broadcaster associated with the transport stream content for the geographical region covered by the DTV translator. Sometimes the original and updated channel numbers will be the same, for example when the translator is being used to fill in a poor reception area of the geographical area covered by the main transmitter. At other times, the original and updated channel numbers will be different, for example, when the translator is being used to extend coverage into a geographical area not covered by the main transmitter. In this instance, the broadcaster may be licensed to broadcast in the translator's geographical area, but at a different channel.

Also, the carrier frequency of the DTV signal transmitted from the translator must be reflected in the PSIP VCT. In most instances, the translator will transmit at a different frequency than it receives, requiring the PSIP VCT to be updated with the new transmitted carrier frequency. In some instances, the carrier frequency of the DTV signal can be transmitted at the same frequency that it is received, such as when the translator system is being used as an on-channel booster. In either instance, the updated PSIP table is then reinserted back into the digital transport stream.

Once the PSIP data is updated, the transport stream containing the updated PSIP data is then input into the 8-VSB modulator 13. 8-VSB modulator 13 processes the digital transport stream according to ATSC DTV standards to produce a DTV signal (Rfo) at the carrier frequency contained in the VCT of the updated PSIP table data. As shown, 8-VSB modulator 13 is controlled by input (TX Channel Select) which informs the 8-VSB modulator 13 at which frequency to transmit the DTV signal. Alternatively, the 8-VSB modulator can detect the carrier frequency information from the VCT of the DTV signal and transmit the DTV signal using the detected carrier frequency.

8-VSB modulator 13 processes the transport stream having the updated PSIP data according to ASTC terrestrial broadcast standards. Accordingly, this processing can include randomization, Reed-Solomon encoding, convolutional interleaving, symbol mapping, trellis encoding, and vestigial sideband filtering. After the digitally filtered signal is converted to an analog signal, the signal is up converted to a transmit RF signal (RFo) at the transmit frequency determined by TX channel select. The 8-VSB modulator 13 typically operates at a frequency of 54 MHZ-216 MHZ and 470 MHZ-806 MHZ and has a maximum output power of approximately 1 milliwatt. A power amplifier 14 and transmitting antenna 15 are usually added to the output of the 8-VSB modulator 13.

Figure 3:
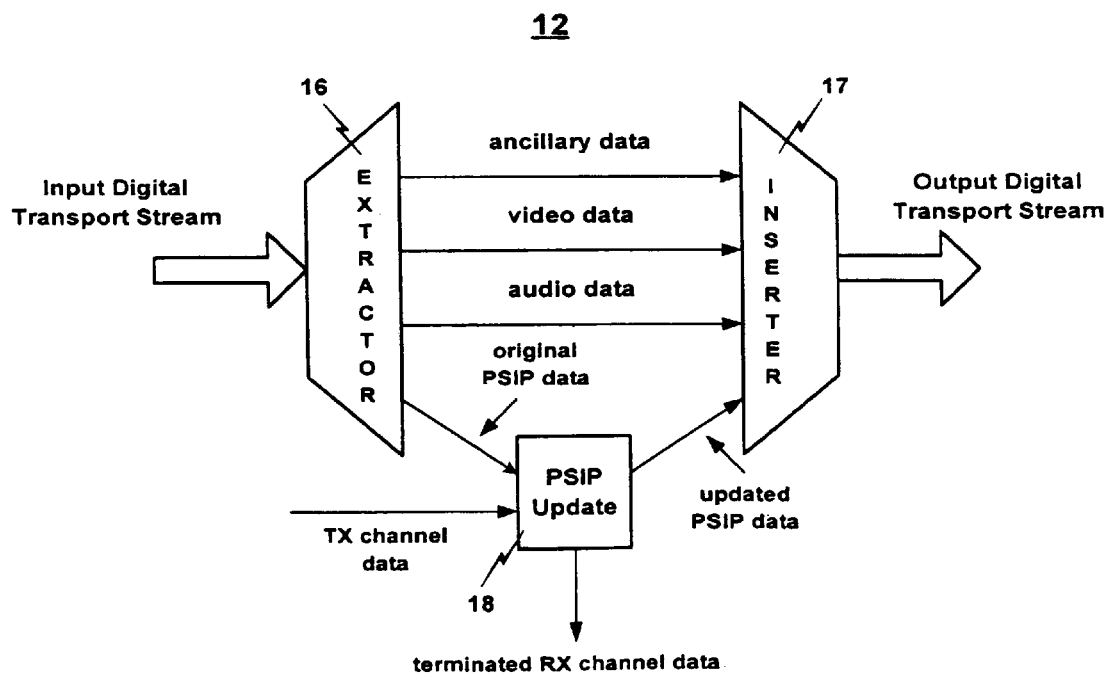
FIG. 3 shows an example of a PSIP update module.

FIG. 3 shows an example of PSIP update module 12. The PSIP update module 12 includes an extractor 16 for extracting the original PSIP data, a PSIP update block 18 for replacing the major/minor channel number and carrier frequency contained in the PSIP table, and an inserter 17 for inserting the updated PSIP table data back into the transport stream. As shown, the PSIP table data is extracted by extractor 16 and input into the PSIP update block 18. The PSIP update block 18 replaces the major/minor channel number and transmit carrier frequency contained in the VCT (a sub-table of the PSIP table) while retaining the other PSIP data. The PSIP update block 18 then substitutes an updated major/minor channel number and transmit carrier frequency into the VCT. Thereafter, the updated PSIP table data is re-inserted back into the digital transport stream via inserter 17.

Figure 4:
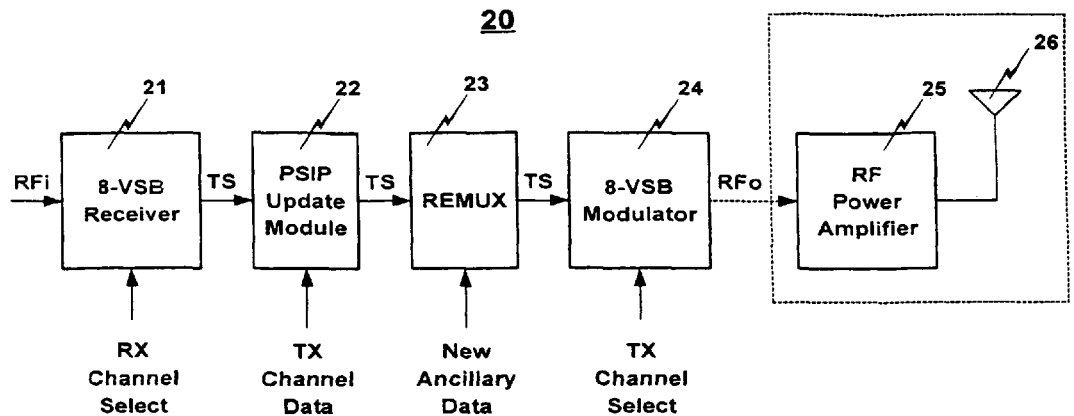
FIG. 4 shows a second embodiment of a DTV translator of the present invention having both PSIP table update capability and a re-multiplexor.

FIG. 4 shows a second embodiment of a DTV translator 20 of the present invention. The second embodiment includes an 8-VSB receiver 21, a PSIP update module 22, a re-multiplexor 23, and an 8-VSB modulator 24. Usually an RF power amplifier 25 and an antenna 26 are coupled to the 8-VSB modulator 24. The structure and operation of the second embodiment is the same as the structure and operation of the first embodiment, except that a re-multiplexor 23 is added for introducing new ancillary data into the digital transport stream.

The digital transport stream containing original ancillary data and the updated PSIP table data is input into the re-multiplexor 23. Re-multiplexor 23 substitutes new ancillary data in place of the original ancillary data in the digital transport stream. The digital transport stream is then sent to 8-VSB modulator 24 and converted into a DTV signal consistent with the operation as described in the first embodiment. In this way, each translator can distribute new ancillary data to user(s) in the translator's transmit range.

Figure 5:
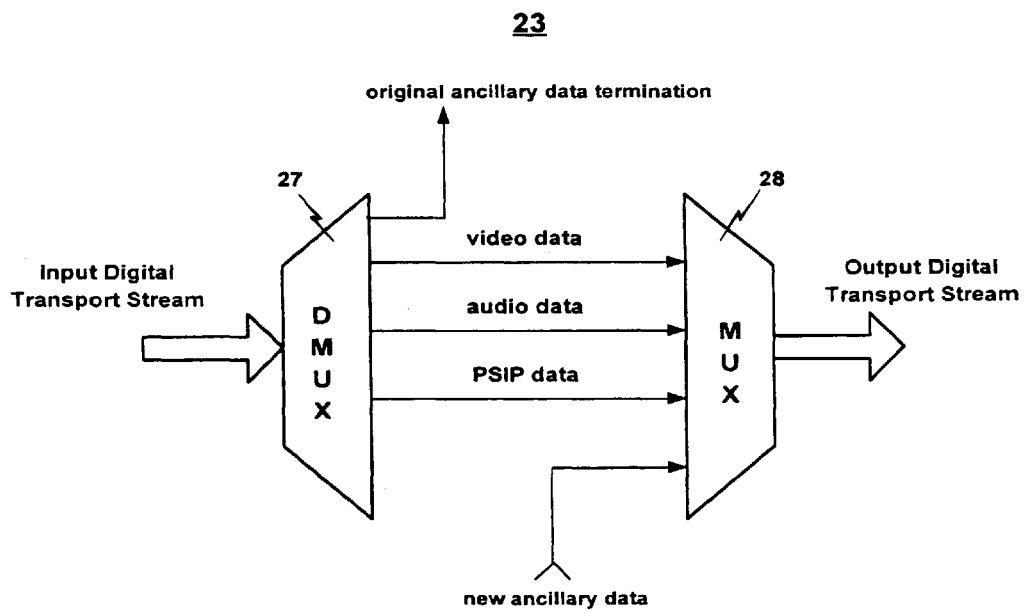
FIG. 5 shows an example of the re-multiplexor.

FIG. 5 is a block diagram of the re-multiplexor 23, which comprises a demultiplexor 27 and a multiplexor 28. As shown, the original ancillary data, video data, audio data, and updated PSIP table data is contained in the input digital transport stream, which is demultiplexed into separate bit streams by de-multiplexor 27. The original ancillary data is terminated (discarded). The multiplexor 28 then combines the video data, the audio data, the updated PSIP data, and new ancillary data back into the output digital transport stream, which is then input to the 8-VSB modulator 24.

The PSIP update step and the ancillary data insertion step are not required to take place in any particular order. For example, since the PSIP data has been separated into its constituent streams by demultiplexor 27 of re-multiplexor 23, the PSIP table update step could take place in the re-multiplexor 23 by updating the major/minor channel number and carrier frequency. The updated PSIP table data could be reinserted into the digital transport stream by multiplexor 28. Or, for example, the placement of the PSIP update module 22 and the multiplexor 23 could be reversed. Moreover, only a portion of the original ancillary data could be replaced with new ancillary data thereby allowing other portions of the ancillary data to be transmitted downstream by the translator.

The second embodiment allows DTV broadcasting stations to increase their data broadcasting capacity every time a DTV translator is added. For example, adding a DTV translator increases the number of users and increases the capacity for data transmission through employment of the new ancillary data, which permits the insertion of data, such as Internet data. Downstream Internet data can be inserted as new ancillary data by each translator and distributed to specific geographic regions and users without the need for additional bandwidth.

Figure 6:
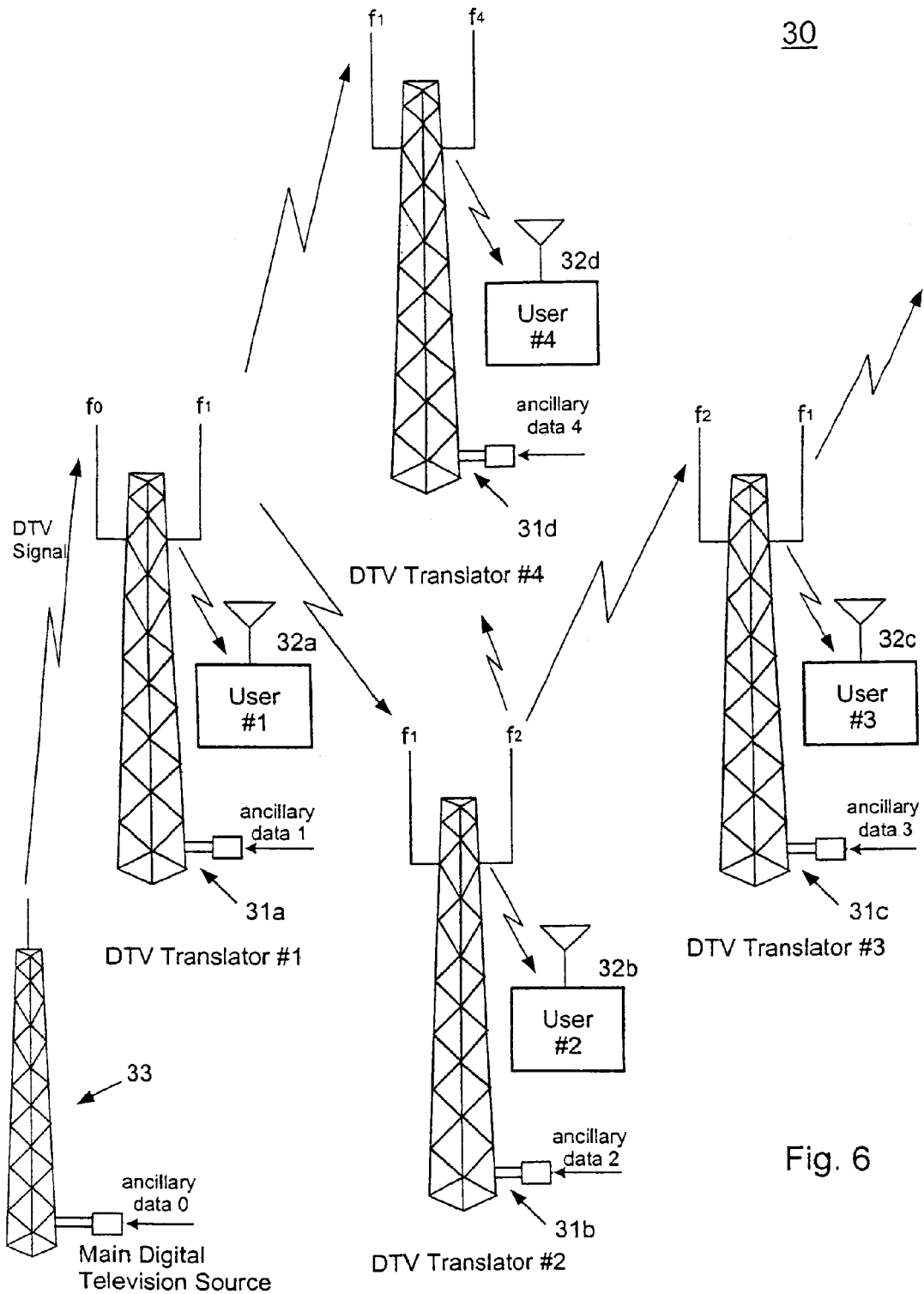
FIG. 6 shows an example of an information distribution network of the present invention using multiple translators.

FIG. 6 shows an example of a third embodiment of the invention wherein an information distribution network 30 uses a plurality of translators to increase the data capacity of the network. As shown, a plurality of translators, collectively labeled 31a-31d, translate and distribute a DTV signal in both a star and daisy-chain configuration.

The first translator 31a receives a DTV signal containing original ancillary data 0, such as Internet download data at a frequency fo. Translator 31a inserts ancillary data 1 and discards original ancillary data 0, and then retransmits the modified DTV signal having ancillary data 1 at a frequency f1. User 32a receives ancillary data 1 from translator 31a. A second DTV translator 31b receives the translated DTV signal from translator 31a at a frequency of f1, substitutes ancillary data 2 for ancillary data 1, and then retransmits at a frequency f2. User 32b receives the DTV signal transmitted from translator 31b along with ancillary data 2. User 32d also receives ancillary data 1 from translator 31a. A third DTV translator 31c receives the translated DTV signal from translator 31b at a frequency of f2, substitutes ancillary data 3 for the ancillary data 2, and retransmits at a frequency f1. User 32c receives the DTV signal transmitted from translator 32c along with ancillary data 3. DTV translators 31a, 31b, and 31c are thus configured in a daisy-chain fashion with translators 31a and 31c being endpoints.

Further, a fourth DTV translator 31d receives the translated DTV signal from translator 31a at a frequency of f1, substitutes ancillary data 4 for ancillary data 1, and then retransmits at a frequency f4. User 32d receives the DTV signal transmitted from translator 31d along with ancillary data 4. DTV translators 31a, 31b, and 31d are thereby configured in a star fashion with DTV translator 31a configured as a hub. Moreover, a variety of translator topologies can be employed to transmit unique ancillary data to each of a very large number of users, or a group of users, without requiring an increase in the bandwidth of any single translator's transport stream or physical RF channel.

Even more efficient use of bandwidth can be achieved by allowing multiple translators to use the same transmit frequencies, as does translators 31a and 31c. Translators can be placed in any number of configurations to increase the data capacity of the DTV distribution network. Furthermore, the use of a PSIP update model in each of the translators can insure proper DTV reception.

Moreover, while the embodiments described herein can be implemented via current ASTC standards, it is contemplated that other DTV standards or a modified ASTC standard could be readily employed to realize the present invention. Further, while the video data on the digital transport stream can be MPEG2 standard video data, as described herein, the invention contemplates using variations of MPEG2 standard data in the digital transport system.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A system for translating a first digital transport stream containing one or more digital television programs carried in the first digital transport stream, comprising:
a program information update unit, the program information update unit supplementing one or more attributes for a virtual channel of a digital television program carried in the first digital transport stream; and
a multiplexor, the multiplexor combining the one or more attributes supplemented by the program information update unit and the first digital television program carried on the first digital transport stream to form a second digital transport stream.

2. A system for translating, comprising
an extractor, the extractor separating a first program information table from video data and audio data contained in a first digital transport stream, the first program information table containing one or more attributes for a virtual channel of a first digital television signal;
a program information update unit, the program information update unit replacing the first program information table with a second program information table, the second program information table including one or more new attributes for the virtual channel of the first digital television signal carried in the first digital transport stream; and
a combiner, the combiner combining the second program information table with the separated video and audio data.

3. The system for translating of claim 2, wherein an inserter adds new data to the second program information table.

4. The system for translating of claim 2, wherein an inserter adds Internet Protocol packets arriving from an Internet Protocol network to the separated video data and audio data.

5. The system for translating of claim 2, further comprising a digital television receiver that generates the first digital transport stream from the first digital television signal, having ATSC PSIP tables.

6. The system for translating of claim 2, wherein the one or more attributes for the virtual channel of the first digital television signal identifies the virtual channel number of the channel of the first digital television signal.

7. The system for translating of claim 2, wherein the first digital transport stream includes ATSC PSIP Tables.

8. The system for translating of claim 2, wherein the combiner combines the second program information table with the separated video and audio data to create a second digital transport stream.

9. A method for translating, comprising
separating a first program information table from video data and audio data contained in a first digital transport stream, the first program information table containing one or more attributes for a virtual channel of a first digital television signal;
replacing the first program information table with a second program information table, the second program information table including one or more new attributes for the virtual channel of the first digital television signal carried in the first digital transport stream; and
combining the second program information table with the separated video and audio data.

10. The method for translating of claim 9, further comprising adding new data to the second program information table.

11. The method for translating of claim 9, further comprising adding Internet Protocol packets arriving from an Internet Protocol network to the separated video data and audio data.

12. The method for translating of claim 9, further comprising generating the first digital transport stream from the first digital television signal, having ATSC PSIP tables.

13. The method for translating of claim 9, wherein the one or more attributes for the virtual channel of the first digital television signal identifies the virtual channel number of the channel of the first digital television signal.

14. The method for translating of claim 9, wherein the first digital transport stream includes ATSC PSIP Tables.

15. The method for translating of claim 9, further comprising combining the second program information table with the separated video and audio data to create a second digital transport stream.

* * * * *